Patented Sept. 2, 1947

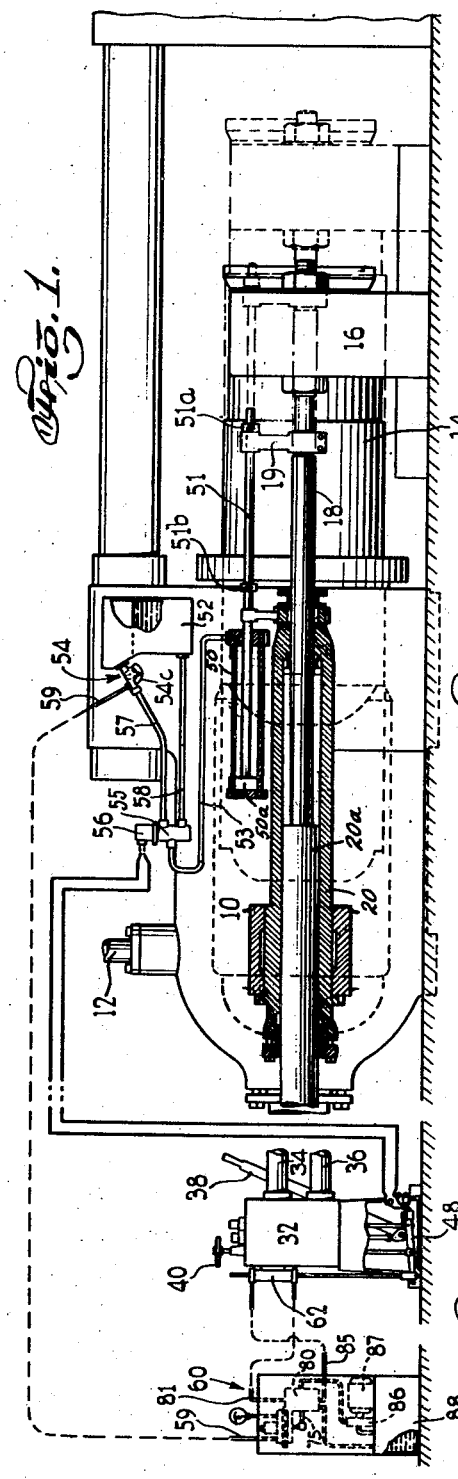

2,426,692

UNITED STATES PATENT OFFICE 2,426,692

SPEED REGULATING APPARATUS FOR HYDRAULIC PRESSES

Francis Katz, New York, N. Y., assignor to Hydropress, Incorporated, New York, N. Y., a corporation of Delaware Application October 6, 1943, Serial No. 505,110

7 Claims. (Cl. 121—38)

This invention relates to hydraulic presses and particularly to hydraulic extrusion presses.

In the extrusion of metals, such as high strength aluminum and magnesium alloys, the extruded shapes crack and must be discarded if they are extruded too fast. Unduly slow extrusion, on the other hand, wastes time and seriously reduces the output of extrusion presses.

To control the speed of operation of hydraulic presses therefore is an important practical need, yet this need has never been fully satisfied. Known extrusion presses have been provided with manually operated control valves to be manipulated by the press operator, during each extrusion or working stroke so as to adjust the liquid supply to the press cylinder and thus conform the ram speed as nearly as practicable to the needs of the process. The quality of control thus achieved, however, is limited by the attentiveness and skill of the press operator, and even the most proficient operators are not able to maintain an optimum extrusion speed in every working stroke under practical conditions because the speed changes with the resistance of the alloy being extruded and this in turn, for a certain alloy and a certain die shape, changes with the temperature of the billet and with its length, which gradually decreases as the extrusion proceeds.

The principal object of my invention is to increase the operating efficiency and the output of hydraulic presses and to improve the average quality of the products produced in their operation. This object I achieve by providing mechanism in combination with the press which operates in coordination with the movement of the main ram so as to maintain the speed of the ram at a predetermined value in the working stroke of each operating cycle. Thus extrusion operations, for example, may be carried out without the losses of time, output and product quality heretofore encountered under the limitations of manual speed control.

Another object of my invention is to provide a speed regulating apparatus for hydraulic presses which has variable settings each corresponding to a certain pressing speed that may be established and automatically maintained in successive operating cycles of the press when the apparatus is adjusted to that setting. In this way the speed of the pressing operation is made readily adaptable to the needs of any particular process for which the press is to be used.

The foregoing and other objects, features and advantages of my invention will become apparent from the following description of an illustrative embodiment thereof. The description refers to the accompanying drawings which form a part hereof, and in which Figure 1 is a diagram showing an automatic speed regulating apparatus combined with a metal extrusion press according to a preferred embodiment of my invention;

Figure 2 is an enlarged diagrammatic view of apparatus used in Figure 1 to produce a control force or pressure proportionate to the speed of movement of the press ram;

Figure 3 is an enlarged diagrammatic view of a regulator which operates in response to the control force; and Figure 4 is an enlarged diagrammatic view of apparatus for controlling the supply of liquid to the press cylinder in automatic response to the regulator during each working stroke of the press, and according to the position of suitable manually operated controls in other stages of each operating cycle.

Some of the elements of a metal extrusion press are shown diagrammatically in the background of Figure 1, including the press cylinder 10, into which liquid may be admitted under high pressure through a pipe 12, and a main ram 14 which is movable forwardly with respect to the press cylinder under the pressure of liquid in the cylinder. A sliding cross-head 16 is attached to the main ram near its forward end, and a pullback ram 18 connects this cross-head with a piston 20a inside a pullback cylinder 20 which returns the main ram to its initial position after each working or extrusion stroke.

The supply of liquid into the press cylinder is controlled in part by a main control valve of known construction located within a housing 32. Liquid under pressure is supplied into this housing through pipe 34 from a pressure accumulator, and passes from the housing to the press cylinder through a pipe 36, to pipe 12, all in well known manner. The main control valve has several conditions of actuation determined selectively by the positions of a main control lever 38. These include a "prefilling" position, a "stop" position and a "pressure" position, as indicated diagrammatically in the drawings, as well as a "pullback" position which is usually provided but is not illustrated because unnecessary to a clear understanding of the present invention. When lever 38 is moved to the prefilling position the main ram is moved forward by low pressure liquid at a speed many times greater than the extrusion speed, this stage of the operating cycle being for the purpose of charging a billet into a cylindrical container or billet chamber (not shown) from which the billet is to be extruded. Following the charging of a billet, a "dummy block" is inserted into the billet chamber between the billet and the end of the main ram, and the main control lever is then moved to the "pressure" position to supply liquid under high pressure and start the extrusion operation. At the end of the extrusion stroke the main control lever is moved to the "stop" position to cut off the pressure in the press cylinder, after which further manipulations occur in the usual manner to return the main ram to its starting position for another operating cycle.

According to prior practices, the ram speed during the extrusion stroke is usually adjusted with a separate, manually operated regulating valve and is readjusted when, with decreasing billet length and diminishing resistance, the ram gathers speed.

According to the illustrated embodiment of this invention, such manual regulation of the speed of the ram may be secured by manipulating a wheel 40 so as to determine the position of a special regulating valve 42 which receives the liquid in pipe 34 from the accumulator and passes this liquid to the main control valve through a conduit 44 in housing 32, and from the main control valve to the press cylinder through connected pipes 36 and 12. The manually operated regulating gear 40 is able to position valve 42 with respect to its seat 46 by changing the vertical position of a rod 47 which has holes 47a and 47b therein, one of which may be engaged by a pin 48a on a lever 48 that is fulcrumed at its right end, at 48b, and in turn is connected with valve 42 through a rod 49.

In the normal operation of the present invention, however, the manual regulating gear just described is not used for the speed control. Instead, the pin 48a is held removed from holes 47a and 47b so as to have rod 47 disconnected from lever 48, and the speed of the ram is controlled automatically according to the system now to be described.

The main elements of the illustrated automatic speed regulating apparatus are: (1) an auxiliary cylinder 50 connected hydraulically with a fluid tank 52 through an orifice 54, and having a piston 50a connected mechanically through rod 51 for movement with the main ram of the press; (2) a pressure operated regulator 60 which responds to the pressure ahead of orifice 54 so as to control the action of a valve operating cylinder 62; and (3) the special regulating valve 42 connected through rod 49, lever 48, bracket 68 and rod 66 with a piston 64 inside the operating cylinder 62.

Referring more particularly to the auxiliary cylinder and its associated apparatus, the pullback ram 18 is provided with a bracket 19 that is slidable along piston rod 51 between collars 51a and 51b secured thereto. These collars are so located that the bracket will engage collar 51a at about the completion of the prefilling stroke of the main ram and will advance rod 51 and the piston inside cylinder 50 as the main ram 14, the cross-head 16 and the pullback ram 18 move forwardly during each extrusion stroke. Bracket 19 engages collar 51b and thereafter returns the piston inside cylinder 50 to its initial position at the back end of that cylinder during the pullback stroke of the main ram.

The provision of idle space between the collars 51a and 51b on piston rod 51 produces a lost motion between the ram and the piston which permits the auxiliary cylinder 50 to be much shorter than the full traverse of the ram. Further, since collar 51a is adjustable on the piston rod, the start of speed regulation may be made to coincide with the start of extrusion of a billet of any length.

The auxiliary cylinder 50 is filled with oil or other suitable fluid and is connected through a main conduit 53 to a three-way valve 55 operated by a solenoid 56. A conduit 57 leads from the three-way valve to the orifice 54, which discharges into the upper part of tank 52. Another conduit 58 leads from the valve into the bottom of tank 52. The tank is located somewhat higher than cylinder 50, so that when conduit 58 is connected through valve 55 with conduit 53 a gravity flow may take place from the tank into cylinder 50.

The orifice structure 54 provides a restricted passage across conduit 57, and a pressure line 59 containing oil or another suitable pressure medium is connected with the same conduit ahead of the orifice. It will therefore be evident that when conduit 57 is connected through valve 55 with conduit 53 and the piston in cylinder 50 is advanced with the movement of the main ram, the liquid in the cylinder will be discharged forcibly through the orifice and a pressure will be established in line 59 which is proportionate to the velocity of the flow, which in turn is proportionate to the speed of movement of the main ram. The size of the orifice preferably is made adjustable by suitable means, such as a rotary element 54a, and indicating means such as a pointer 54b movable over a dial 54c may be provided on element 54a to indicate the setting of the orifice. This setting, as hereinafter will become apparent, becomes a function of the pressing speed that will be maintained automatically by the operation of the speed regulating apparatus, and if desired the dial 54c may be calibrated so as to indicate selectable press speeds.

The pressure in line 59 is transmitted to the regulator 60 where, as illustrated diagrammatically in Figure 3, it acts upon a diaphragm, bellow, piston or similar device, such as diaphragm 70, in opposition to a predetermined yieldable force such as that produced by a spring 71. Diaphragm 70 in turn is connected through rod 74 and lever 75 with an auxiliary valve 80, which admits oil or another suitable pressure fluid through lines 81 and 82, respectively, to the extremities of the operating cylinder 62. Movements of the diaphragm away from a normal position by the pressure in line 59 or by the opposing force of spring 71 thus result in the application of fluid pressure to either one or the other side of the piston 64 in cylinder 62. This piston is so linked to the special regulating valve 42 and is so operated by the regulator 60 that an increase in the pressing speed causing an increase of pressure in line 59 tends to close the regulating valve, while a decrease of the pressing speed tends to open the regulating valve.

In further detail, the auxiliary valve 80 may comprise two oppositely disposed tappets 83 and 84 in lines 81 and 82, respectively, which communicate with a common pressure line 85 connected with a suitable source of fluid pressure, such as a pump 86 operated by a motor 87 to feed oil from a tank 88. The tappets 83 and 84 normally rest on seats 83a and 84a, respectively, and when either of the tappets is raised from its seat the pressure in the corresponding line 81 or 82 is released into a common exhaust line 89 that leads back into tank 88. The position of lever 75 established by diaphragm 70 determines the positions of the two valve tappets with respect to their seats and thus controls the pressure conditions on opposite sides of piston 64 in cylinder 62. These in turn determine the position of the piston, the position of regulating valve 42 and the rate of supply of high pressure liquid into the press cylinder, which establishes the ram speed.

The automatic regulating apparatus as thus far described is coordinated with the desired stage of operation of the extrusion press by the provision of means to energize the solenoid 56 of valve 55 during the working stroke of each operating cycle and to deenergize the solenoid valve during the manually controlled phases of each cycle. For example, a limit switch 90 in an electrical circuit for the solenoid is arranged to be closed by an arm 92 connected with the main control lever 38 when the lever is located in its "pressure" position, and suitable means such as a spring (not shown) in switch 90 serve to open the switch and deenergize the solenoid valve when the main control lever is located in any other position.

The operation of the illustrated embodiment is as follows: After preliminary operations of known nature to charge a billet and dummy block and prepare the press for extrusion, the main control lever 38 is moved to the "pressure" position. High pressure liquid then enters the press cylinder to advance the main ram, and limit switch 90 is closed with the effect of connecting the orifice 54 with cylinder 50 through conduits 57 and 53 and valve 55. As the main ram advances in the course of the extrusion, bracket 19 moves therewith against collar 51a and advances rod 51 and the piston in cylinder 50 so as to force liquid through orifice 54 at a velocity that is proportionate to the speed of the main ram. This velocity produces a proportionate pressure in lines 59 which works against diaphragm 70 in opposition to the force of spring 71. An equilibrium position of the diaphragm is thus established which determines the condition of actuation of the auxiliary valve 80 and thereby determines the position of piston 64 in cylinder 62 as well as the position and the rate of flow through the regulating valve 42. If the speed of the main ram begins to exceed that which is predetermined by the setting of orifice 54, the pressure on diaphragm 70 increases, and changes then occur automatically in the positions of valve 80, piston 64 and regulating valve 42 so as to throttle the flow of pressure fluid into the press cylinder with the result of reducing the speed of the main ram to the desired value. If the speed of the main ram should become less than is desired, the system reacts in an opposite sense so as to increase the flow of pressure fluid into the press cylinder and thus compensate for the forces tending to reduce the speed of the ram below the desired value.

An automatic regulation of the pressing speed is thus achieved in direct response to the speed of movement of the main ram and without regard to the nature or value of the factors, such as the length of the billet, the extrusion temperature and the die shape, which at any moment during an extrusion operation exert an indeterminate effect upon the speed of the ram.

When a change of the automatically regulated speed is desired it is necessary only to change the adjustment of orifice 54, which changes the ratio of pressing speed to the velocity of flow through the orifice and thus creates a different equilibrium condition for the apparatus that corresponds to a different pressing speed.

It will be apparent that the new features and combinations herein disclosed may be embodied in various forms of hydraulic presses and with the use of many forms and arrangements of control apparatus differing from those set forth hereinabove for purposes of illustration. I therefore desire that my invention be accorded a scope commensurate with its novel contributions to the art, which are intended to be defined by the appended claims.

I claim:

1. The combination with a hydraulic press comprising a press cylinder, a piston movable through a working stroke by fluid pressure in the cylinder, means including a main control valve and a regulating valve to admit fluid under pressure into the cylinder and selectively operated means movable to several positions to establish different conditions of operation of said control valve, of mechanism operated in coordination with the movement of said piston to regulate the action of said regulating valve so as to maintain the speed of the piston substantially constant, and means to render said regulating mechanism operative when said selectively operated means is moved to the position it occupies during the working stroke of the piston.

2. The combination with a hydraulic extrusion press comprising a press cylinder, a ram movable forward for extrusion by hydraulic pressure in the cylinder and means including a main control valve for admitting liquid under pressure into the cylinder, said main control valve being movable selectively to several different positions of which one is a pressure position for each extrusion operation, of a regulating valve movable to vary the flow of liquid through said main control valve, mechanical linkage means for moving said regulating valve, fluid pressure responsive cylinder means comprising a piston for operating said linkage means, valve means for applying pressure fluid selectively to either side of said piston, a pressure-responsive diaphragm connected with said valve means to govern the position thereof, means including a member moved in coordination with the extrusion movement of said ram for applying to said diaphragm pressure proportionate to the speed of such movement, and means positioned according to the position of said main control valve for rendering said pressure-responsive means ineffective at all but said one position of said control valve, whereby the speed of said ram during extrusion is regulated.

3. In an apparatus for regulating the speed of hydraulic presses, a cylinder having a piston therein adapted to be moved with a press ram and operative during its advance movement to force liquid from the cylinder through a main conduit, a liquid supply tank above the cylinder having upper and lower conduit connections, an orifice in said upper conduit adapted to restrict the flow of liquid therethrough, a pressure line connected with said upper conduit ahead of said orifice, and valve means between said main conduit and said upper and lower conduits movable to connect the main conduit alternately with the upper and lower conduits.

4. The combination with a hydraulic press comprising a press cylinder, a piston movable through an operating cycle of which a working stroke is but a part by fluid pressure in the cylinder, means to admit fluid under pressure to the cylinder, including a main control valve, manually operated means movable to several positions to establish different conditions of operation of said control valve, and a regulating valve, mechanism responsive to the movement of said piston for actuating said regulating valve so as to maintain the speed of the piston substantially constant, and means to render said mechanism operative when said manually operated means is moved to the position it occupies during said working stroke and to render said mechanism inoperative during other parts of said operating cycle.

5. In combination with a hydraulic extrusion press comprising a press cylinder, a ram movable by hydraulic pressure in the cylinder, and means for supplying pressure to said cylinder including a selectively operated valve to establish different conditions of operation of said ram, mechanism for regulating the action of said supply means so as to control the speed of said ram, including an auxiliary cylinder having a piston therein movable with said ram and operative during its working stroke to force liquid through a main conduit, a liquid supply tank above said auxiliary cylinder having upper and lower conduit connections, an orifice in said upper conduit adapted to restrict the flow of liquid therethrough, a pressure line connected with said upper conduit ahead of said orifice, valve means between said main conduit and said upper and lower conduits movable to connect the main conduit alternately with the upper and lower conduits, and means operated upon movements of said selectively operated valve for actuating said valve means so as to connect the main conduit with the upper conduit during the advance movement of said ram and to connect the main conduit with the lower conduit, to refill said auxiliary cylinder with liquid from said tank, during the return movement of said ram.

6. The combination with a hydraulic extrusion press comprising a press cylinder, a ram and means for admitting liquid under pressure to said cylinder to advance the ram, of mechanism operated by advance movement of the ram to vary the action of said liquid-admitting means so as to regulate the speed of movement of the ram, wherein said mechanism includes an auxiliary cylinder adjacent the ram having a piston and a piston rod extending parallel to the ram, and mechanical means for moving said piston rod with movements of the ram comprising means to interrupt the movement of said rod during an intermediate part of the total traverse of the ram.

7. A combination as described in claim 6 wherein said mechanical means include a pusher slidable along the piston rod with movement of the ram and spaced abutments on the piston rod to be engaged by said pusher during parts of the advance and return movements respectively of the ram.

FRANCIS KATZ.

REFERENCES CITED

The following references are of record in the file of this patent:

UNITED STATES PATENTS

| Number | Name | Date |
|---|---|---|
| 404,726 | Nickerson | June 4, 1889 |
| 726,425 | Harmet | Apr. 28, 1903 |
| 1,585,529 | Boving | May 8, 1926 |
| 1,675,212 | Dickinson | June 26, 1928 |
| 1,964,196 | Cuttat | June 26, 1934 |
| 1,992,048 | Temple | Feb. 19, 1935 |
| 2,272,129 | Palmer | Feb. 3, 1942 |

FOREIGN PATENTS

| Number | Country | Date |
|---|---|---|
| 750,976 | France | June 12, 1933 |
| 775,261 | France | Oct. 8, 1934 |